Nov. 30, 1954
G. B. BARSTOW
2,695,474
VASE ADAPTER FOR FLOWERPOTS
Filed July 21, 1948
2 Sheets-Sheet 1
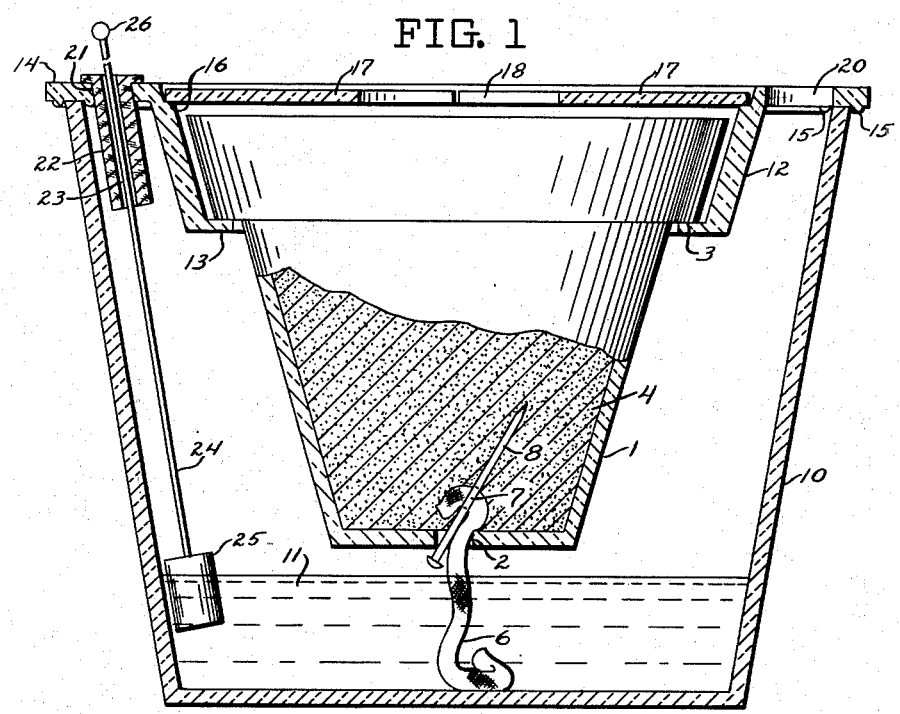
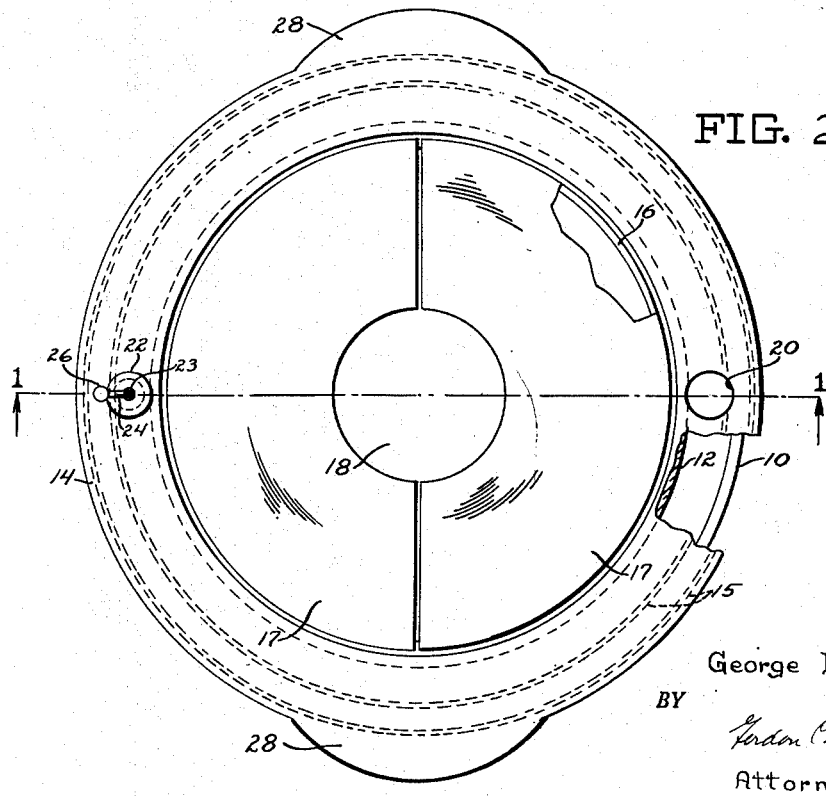
INVENTOR.
George B. Barstow
BY
Attorney Nov. 30, 1954  G. B. BARSTOW  2,695,474
VASE ADAPTER FOR FLOWERPOTS
Filed July 21, 1948  2 Sheets-Sheet 2
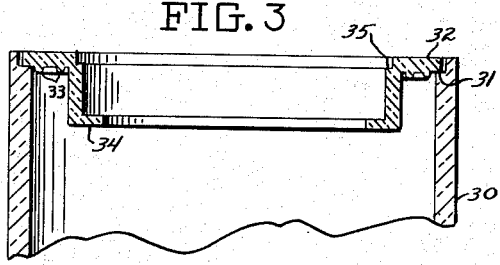
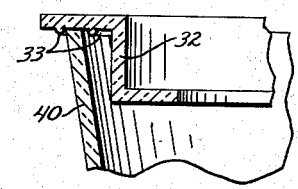
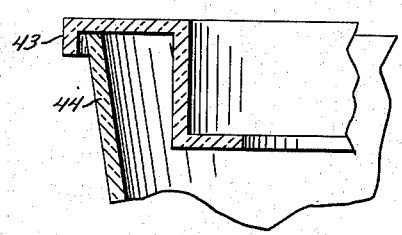
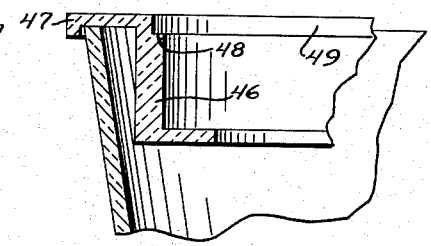
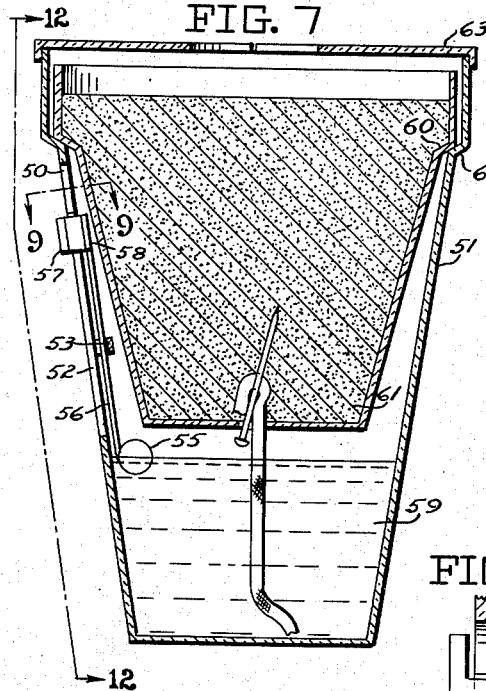
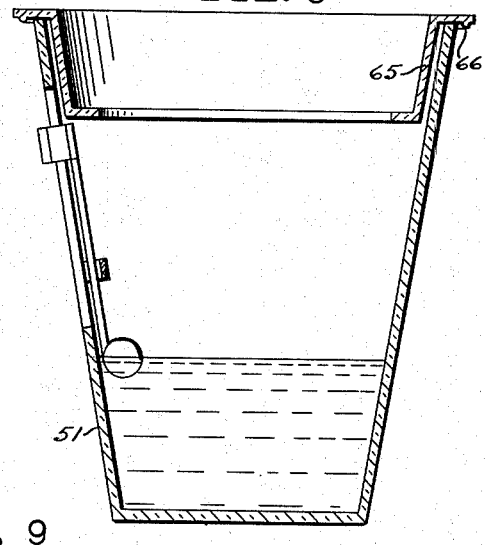
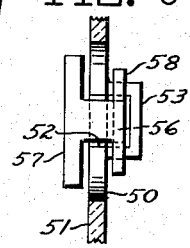
INVENTOR.
George B. Barstow
BY
Attorney

United States Patent Office 2,695,474
Patented Nov. 30, 1954

2,695,474

VASE ADAPTER FOR FLOWERPOTS

George B. Barstow, Akron, Ohio

Application July 21, 1948, Serial No. 39,828

2 Claims. (Cl. 47—38)

This invention relates to an adapter for a wick-watered flower pot and for the combination of the adapter with the flower pot. It includes also a new wick pin, new wicking means, etc.

The use of a wick for watering a potted plant has previously been proposed but such proposals have contemplated the insertion of a wick in the pot before filling it, and there has been no entirely satisfactory holder for a wick-watered plant. According to this invention, means is provided for inserting a wick into a flow pot which contains a potted plant, and a new type of adapter is provided for supporting an ordinary flower pot within a vase or other container. A plurality of pots may be held in a single container. In one preferred arrangement, the adapter is provided with an opening for adding water to the vase or other container and preferably also includes a float to indicate the depth of the water in the container. Alternatively, the container itself may be provided with an opening through which water is supplied. The same or another opening may be provided for float-supported indicating means.

According to this invention a wick may be provided for a potted plant by threading the wick into a wick pin and driving the pin up through the usual bottom opening in the flower pot. A new porous earthenware wick is proposed for this purpose. If the wick is inserted before filling the pot a different kind of wicking means is recommended.

The invention will be further explained in connection with the accompanying drawings in which:

Fig. 1 is a section on the line 1—1 of Fig. 2, both of which illustrate a pot held by an adapter in a covered vase;

Figs. 3, 4, 5, and 6 are sections showing different adapters in combination with a vase;

Fig. 7 is a vertical section through a potted plant in a vase or other container provided with a watering hole and float-indicating means (the plant not being shown);

Fig. 8 is a section through a different type vase with an adapter, showing the same type of water-supplying and indicating means; and Fig. 9 is a view of the indicating means taken on the line 9—9 of Fig. 7.

The flower pot of Fig. 1 and the flower pot shown in each of the other figures is an ordinary clay flower pot. It is customary to provide an opening 2 in the bottom of flower pots for drainage. Spaced a short distance down from the top of the flower pot is the usual shoulder 3. The flower pot is filled with earth 4 and any sort of flower or plant (not shown) may be grown in the pot.

One disadvantage in the usual arrangements for wick watering has been the necessity of inserting the wick before filling the flower pot with earth. Generally speaking, any type of wick watering may be used with the adapter, etc. of this invention but according to a preferred arrangement, the wick 6 is driven into the bottom of a potted plant through the opening 2 by threading the wick through the eye 7 of the respective wicking pin 8 and then driving the pin into the earth in the bottom of the filled pot. Any potted plant may be thus provided with a wick for wick watering.

The flower pot equipped for wick watering is placed in the vase 10 which holds the water 11. The pot is supported by the adapter 12. This adapter rests on the top of the vase 10 and dips into the container at least the distance between the top of the pot 1 and the shoulder 3. The adapter is formed at the bottom with an inwardly extending, horizontal flange 13 on which the shoulder 3 of the flower pot rests. The top of the adapter flares out to form the flange 14 which rests on the top of the container 10. Concentric ridges 15 keep the adapter from shifting. A ledge 16 is provided inside the top of the adapter for the cover 17 which is made in two parts. The opening 18 in the cover accommodates the stem of the plant or plants, which are growing in the pot.

A novel feature of the invention is the opening 20 in the adapter which is for the introduction of water into the container 10. Another opening 21 is provided in which is the cork closure 22 having the opening 23 through which the stem 24 of the indicator passes. This indicator includes a cork float 25. As the level of the water raises and lowers within the container the top 26 of the indicator raises and lowers. The level of this top 26 serves as a signal to the housewife, etc. When it is low, water is needed, and when adding water the indicator shows when enough has been added. It may be marked accordingly.

The advantages of such an arrangement are at once apparent. In the first place, the use of an adapter which holds the flower pot below the top edge of the outer container 10 adds to the attractiveness of the unit. The vase may be decorated as desired. The cover 17 is not necessary and its use is optional. If no cover is to be used the ledge 16 on the adapter will be omitted. Handles 28 may be provided on the adapter to facilitate placement and removal, but as the flower pot will only rarely be removed from the container such handles will ordinarily be omitted. The unit is devised for display purposes in the home or in the window of a florist shop or in any other location. The plant need not be watered more often than once a week or so, because enough water for this length of time may be held in the outer container and the plant will be continuously supplied with the necessary water through the wick 6. The indicator tells the height of the water within the container. It may be suitably marked to indicate when the water level is dangerously low and also when a suitable amount of water has been added to the container. The water should not touch the bottom of the flower pot but may come close to it. As water is required from time to time, it is added through the opening 20. Alternatively, the adapter may be provided with but a single opening and the indicator may then be removed when it is desired to water the plant. The indicator may be omitted if desired.

Figs. 3 to 6 show alternative adapter means. Fig. 3 shows a straight-walled container 30 with a ledge 31 inside its mouth for supporting the adapter 32. The adapter is provided with concentric ridges 33 on the under surface so that it may, if desired, be placed on the top edge of the outer container as illustrated in Fig. 4. The ledge or flange 34 of the container supports the flower pot. The ledge 35 is for a cover, but this may be omitted. The flange 34 is sufficiently below the top edge of the container to conceal most or all of the flower pot and thus to make the unit more sightly. The top flange 32 of the adapter will be provided with an opening for supplying water and there may be another opening provided with an indicator. Such an adapter may be made without any openings if the container is provided with water supplying means and an indicator, as described below.

Fig. 4 shows the same adapter 32 used on an outer container 40 of smaller diameter with the ridges 33 located on opposite sides of the container wall to prevent shifting of the adapter. Fig. 5 shows an adapter having a downwardly extending lip 43 around the outer edge to prevent or limit shifting on the container 44. Fig. 6 shows a similar type of adapter 46 with the lip 47 provided to limit the lateral shifting of the adapter and provided with a ledge 48 for support of a cover 49. Each of the adapters shown in Figs. 4, 5 and 6 may be provided with a watering hole and indicator, or these may be omitted if the outer container is provided with them, as will be described.

Instead of providing an opening in the adapter for the introduction of water to the container, this opening may be provided in the container and located in any suitable place. The indicator if used may likewise be in the wall of the container. Alternatively, if preferred, the watering hole may be in the adapter with the indicator in the container or vice versa, the indicator may be supported in the adapter and the watering hole may be in the wall of the container.

Figs. 7 and 8 illustrate different containers with an opening in the container wall. This opening is advantageously of modified key-hole shape as shown in Fig. 12. The enlargement 50 at the top of the opening in the wall of the container 51 (Fig. 7) is for the introduction of water. Water may easily be supplied through this opening from a tea pot or watering can with a small spout, etc. The narrow opening 52 which extends downwardly from the opening 50 accommodates the indicator which is formed of the float 55, the stem 56 and the indicator plate 57. The top of the indicator stem may advantageously be widened as at 58 (Fig. 9) to steady the indicator as it rides up and down in the slot 52. One or more braces 53 which bridge the slot 52 inside of the container may be provided to keep the indicator in place. The outside wall of the container may be graduated to indicate the amount of water 59 which the container holds. With this type of watering and indicating means no adapter is necessary. The shoulder 60 of the flower pot 61 may rest directly on the ledge 62 of the container. The container may or may not be provided with a cover 63.

Fig. 8 shows the use of an adapter 65 with such a container 51. This adapter is provided with a single ridge 66 which fits outside the wall of the container. A ridge fitting immediately inside the wall of the container would be equally satisfactory.

The units shown in Figs. 7 and 8 are operated in the same manner as the units shown in Fig. 1. The indicator shows when watering is necessary, and is useful when water is being added to the container to show how much water has been added. The opening 50 for the addition of water may be located at any convenient place. It may be made separate from the indicator opening 52. The indicator opening may be omitted if desired, as the use of an indicator is not essential, but desirable.

The drawings are illustrative. Any adapter may be used with different containers. Different wicking means may be employed. For instance, a pointed porous baked earthenware wick, either straight or hooked at the upper end may be used. A number of pots may be placed in the same container. The use of an indicator is optional. When indicators are employed a separate opening for the introduction of water is optional as the indicators may be removable and the water supplied through the opening which holds the indicator. Covers for the flower pots are optional and may be of any suitable design. The outer containers may be made of metal, porcelain, plastic, etc. and may be suitably decorated.

What I claim is:

1. In combination, a vase with a substantially circular top and a unitary adapter with an annular flange extending outwardly from the top thereof and resting on the top of the vase, located below the top of the vase an annular flange extending inwardly from the bottom of the adapter, and a substantially circular wall slanting upwardly and outwardly and connecting the outer edge of the bottom flange with the inner edge of the upper flange, the bottom flange being adapted to support the shoulder of a flower pot projecting from the outer wall of the pot near the top thereof, there being a ledge at the inner edge of the upper flange adapted to support a cover made in a plurality of parts and having an opening in the center thereof to accommodate the stem of a plant growing in the pot.

2. In combination, a vase and a unitary adapter with an annular flange extending outwardly from the top thereof and resting on or near the top of the vase, located below the top of the vase an annular flange extending inwardly from the bottom of the adapter, and a wall extending upwardly and connecting the outer edge of the bottom flange with the inner edge of the upper flange, the bottom flange being adapted to support the shoulder of a flower pot projecting from the outer wall of the pot near the top thereof, there being a ledge at the inner edge of the upper flange adapted to support a cover made in a plurality of parts and having an opening in the center thereof to accommodate the stem of a plant growing in the pot.

References Cited in the file of this patent

UNITED STATES PATENTS

| Number | Name | Date |
| --- | --- | --- |
| 249,175 | Hall | Nov. 8, 1881 |
| 303,543 | Prentiss | Aug. 12, 1884 |
| 320,588 | Rhoads | June 23, 1885 |
| 918,563 | Lewis | Apr. 20, 1909 |
| 1,036,088 | Fortescue | Aug. 20, 1912 |
| 1,221,449 | Hitchcock | Apr. 3, 1917 |
| 1,317,569 | Forster | Sept. 30, 1919 |
| 1,641,244 | Woodruff | Sept. 6, 1927 |
| 1,712,986 | Favata | May 14, 1929 |
| 1,940,044 | Brandt | Dec. 19, 1933 |
| 2,019,210 | Boden | Oct. 29, 1935 |
| 2,072,185 | Schein | Mar. 2, 1937 |
| 2,084,005 | Richards | June 15, 1937 |
| 2,249,197 | Brundin | July 15, 1941 |
| 2,228,892 | Zimmerman | Jan. 14, 1941 |
| 2,463,719 | Schackett et al. | Mar. 8, 1949 |
| 2,492,152 | Hollowell | Dec. 27, 1949 |

FOREIGN PATENTS

| Number | Country | Date |
| --- | --- | --- |
| 21,034 | Great Britain | 1907 |
| 158,098 | Great Britain | Jan. 31, 1921 |
| 243,798 | Switzerland | Feb. 1, 1947 |
| 292,154 | Germany | May 27, 1916 |
| 577,276 | France | June 2, 1924 |